Figure 12:
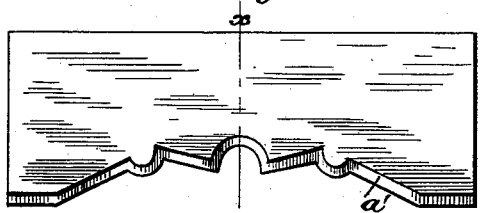
Figure 13:
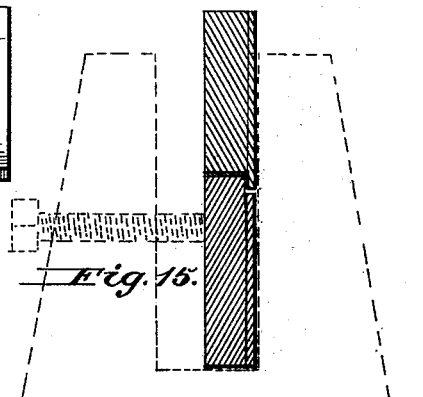
Figure 14:
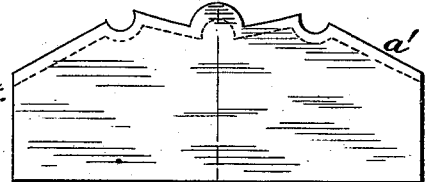
Figure 15:
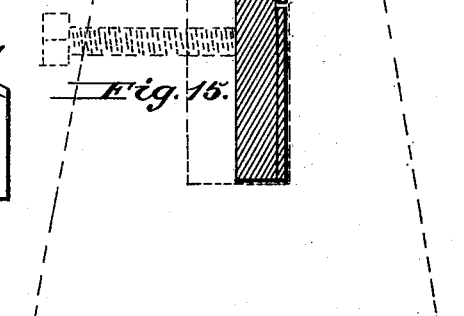
Figure 16:
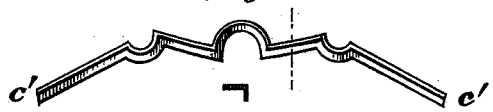
Figure 18:
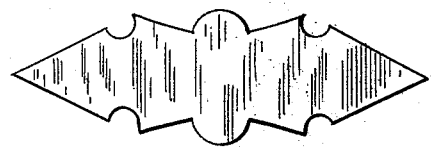
Figure 17:
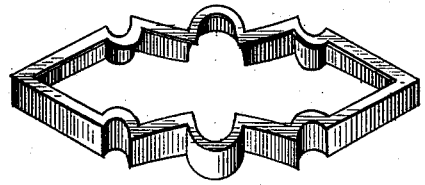
Figure 19:
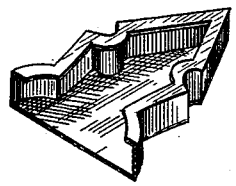

2 Sheets—Sheet 1.
J. W. & I. M. MILLER.
Manufacture of Jewelry.
No. 215,235. Patented May 13, 1879.
Fig. 1. 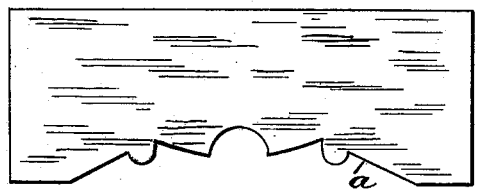 Fig. 2. 
Fig. 3. 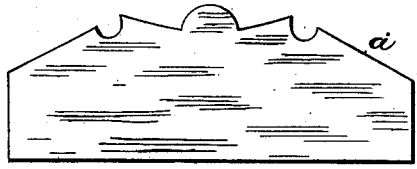  Fig. 4.
Fig. 5.
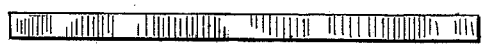
Fig. 6. 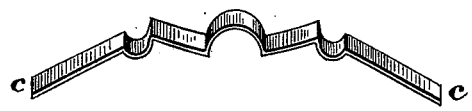 Fig. 9. 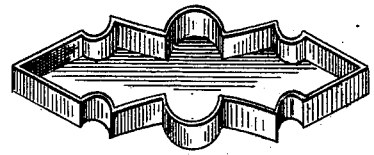
Fig. 7. 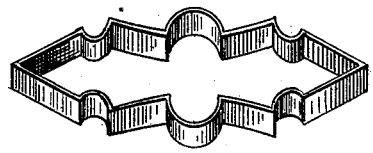 Fig. 10. 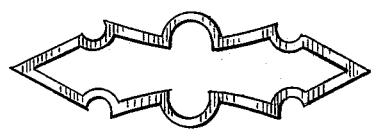
Fig. 8. 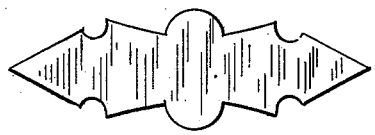 Fig. 11. 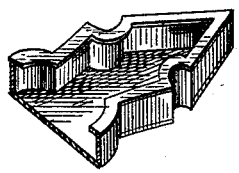
Witnesses
Chas B Broomis
H. A. Hovet
Inventors.
James W Miller
Isaac M Miller J. W. & I. M. MILLER.
Manufacture of Jewelry.

No. 215,235. Patented May 13, 1879.

Witnesses
Chas B Browne
H. A. Hovet.

Inventors.
James W Miller
Isaac M Miller

UNITED STATES PATENT OFFICE.

JAMES W. MILLER, OF NEWARK, AND ISAAC M. MILLER, OF ORANGE, N. J.

IMPROVEMENT IN THE MANUFACTURE OF JEWELRY.

Specification forming part of Letters Patent No. 215,235, dated May 13, 1879; application filed February 13, 1879.

*To all whom it may concern:*

Be it known that we, JAMES W. MILLER, of the city of Newark, and ISAAC M. MILLER, of Orange, both in Essex county, State of New Jersey, have invented a new and useful Improvement in the art of Manufacturing Jewelry; and we hereby declare that the following description is such as will enable others skilled in the art to make and use the same, reference being had to the accompanying drawings, forming a part of this specification, and to the letters and figures of reference marked thereon.

The object of our invention is to beautify, strengthen, and cheapen the manufacture of jewelry.

To more clearly show our new process, we will first describe the old method or process usually employed, then our new process.

Figure I represents an old upper shaper. Fig. II represents a sectional view of an old upper shaper. Fig. III represents an old lower shaper. Fig. IV represents a sectional view of an old lower shaper.

$a$ $a$ represent the working edges of the old lower and upper shapers.

Fig. V represents a strip or piece of gold or other metal previous to being placed between the edges $a$ $a$ of the upper and lower shapers. Fig. VI represents the strip or piece of gold or other metal, as in Fig. V, after being bent into shape by the edges $a$ $a$ of the upper and lower old shapers. (See Figs. I and IV.) Fig. VII represents two bent strips, as in Fig. VI, soldered together at their ends $c$ $c$, thus forming the skeleton of an article. Fig. VIII represents a face view of a top of an article previous to soldering to the skeleton or border. Fig. IX represents an inverted view of the skeleton with top (see Fig. VIII) soldered on, thus showing the thin edge of articles made previous to our new invention. Fig. X represents a cut or pierced rim previous to its being soldered to the thin edge of the skeleton. (See Fig. IX.) Fig. XI represents a sectional view of a finished article.

Owing to the expense in cutting or piercing out a rim to fit the different outlines of the desired article, manufacturers have generally left the edge on the back of an article with its thin edge, thus making the article necessarily weak.

By our new invention we obviate the extra expense of making extra tools as required by the old way and the time and labor taken to solder the rim on when pierced out.

We will now describe our new invention.

Fig. XII represents a view of our new upper shaper. Fig. XIII represents a sectional view of our new upper shaper, taken on line $x$ $x$, Fig. XII. Fig. XIV represents a view of our new lower shaper. Fig. XV represents a sectional view of our new lower shaper, taken on line $x$ $x$, Fig. XIV.

$a'$ $a'$ represent the working edges of our new upper and lower shapers, which are made to correspond in form and shape to the desired article, and are used in bending and compressing or swaging pieces of gold or other metal, as shown in Fig. V, into preparatory forms, as shown in Fig. XVI. These edges are arranged in the shape of an L, so that when brought together the flange part of the L-edge of the upper shaper will press the edge of the strip of metal into the flange part of the L edge of the lower shaper, thus producing a rim at once turned at right angle to the strip of metal with which the border or skeleton of an article is to be made, producing the same in a cheap and easy manner by compression.

By this method the expensive system heretofore in use and described in this specification of cutting or piercing out a rim, and soldering the same upon the article, is avoided, and manufacture thereby cheapened.

Fig. XVI represents the strip of gold or other metal, as shown in Fig. V, bent and compressed into form, but with rim provided by our new process. Fig. XVII represents two bent and compressed strips of gold or other metal, as shown in Fig. XVI, soldered together at the ends $c'$ $c'$, thus forming the skeleton or border and rim of an article. Fig. XVIII represents a face view of a top of an article previous to soldering to the skeleton or border. Fig. XIX represents a sectional view of a finished article.

We claim—

The hereinbefore-described improvement in the art of manufacturing jewelry, which consists in bending strips of metal into the forms required for one side of the desired article by means of suitable dies, and simultaneously by means of the dies forming the rear flange or rim, as and for the purpose described.

JAMES W. MILLER.
ISAAC M. MILLER.

Witnesses:
ORVILLE T. SMITH,
THOS. B. CLIFFORD.